(12) United States Patent
Yokoo et al.

(10) Patent No.: US 7,338,701 B2
(45) Date of Patent: Mar. 4, 2008

(54) LAMINATED COMPOSITE WOODEN MATERIAL AND METHOD OF MANUFACTURING MATERIAL

(75) Inventors: Kuniharu Yokoo, Nishinomiya (JP); Minoru Masuda, Ohtsu (JP); Koji Murata, Kyoto (JP)

(73) Assignee: Uniwood Corporation, Hyogo (JP)

( * ) Notice: Subject to any disclaimer, the term of this patent is extended or adjusted under 35 U.S.C. 154(b) by 166 days.

(21) Appl. No.: 10/493,203

(22) PCT Filed: Oct. 24, 2002

(86) PCT No.: PCT/JP02/11022

§ 371 (c)(1),
(2), (4) Date: Apr. 21, 2004

(87) PCT Pub. No.: WO03/035341

PCT Pub. Date: May 1, 2003

(65) Prior Publication Data

US 2005/0006003 A1 Jan. 13, 2005

(30) Foreign Application Priority Data

Oct. 26, 2001 (JP) ............................. 2001-329296

(51) Int. Cl.
*B32B 7/02* (2006.01)
(52) U.S. Cl. ...................... 428/212; 428/106; 428/535; 428/537.1; 52/313; 52/314; 52/514; 52/730.7; 156/306.6
(58) Field of Classification Search ............ 428/537.1, 428/106, 535, 212; 52/514, 730.7, 314, 313; 156/306.6
See application file for complete search history.

(56) References Cited

U.S. PATENT DOCUMENTS

| | | | | |
|---|---|---|---|---|
| 2,354,725 A | * | 8/1944 | Weyerhaeuser | ............... 428/76 |
| 4,844,763 A | * | 7/1989 | Robbins | ..................... 156/269 |
| 4,968,549 A | * | 11/1990 | Smimizu et al. | ............ 428/106 |
| 5,456,964 A | * | 10/1995 | Tamura et al. | .............. 428/105 |
| 5,593,530 A | * | 1/1997 | Hashiguchi | ................. 156/260 |

(Continued)

FOREIGN PATENT DOCUMENTS

JP 56-115204 * 9/1981

(Continued)

OTHER PUBLICATIONS

Merriam-Webster Dictionary (Online ed. 2006), available at http://www.merriam.com/.*
Rating Certificate, no date.
Japanese Agricultural Standard For Plywood (S-1), no date.

(Continued)

*Primary Examiner*—Milton I. Cano
*Assistant Examiner*—David J. Joy
(74) *Attorney, Agent, or Firm*—Birch, Stewart, Kolasch & Birch, LLP

(57) ABSTRACT

A seven-layered laminated composite lumber 1 is constructed by stacking veneers 2, whose oven-dry specific gravity is 0.6 or larger, alternately with veneers 3, whose oven-dry specific gravity is 0.4 or less, and by bonding them together. The invention can thus provide a laminated composite lumber that is light in weight, is substantially resistant to warping and distortion, and yet retains the desired bending strength and nail holding power, and a method of producing such a laminated composite lumber.

8 Claims, 17 Drawing Sheets

U.S. PATENT DOCUMENTS

2001/0017186 A1 * 8/2001 MacPherson et al. ....... 156/298

FOREIGN PATENT DOCUMENTS

| JP | 56-115204 A | 9/1981 |
| JP | 58-31103 | 3/1983 |
| JP | 1-158103 | 11/1989 |
| JP | 3-202302 | 9/1991 |
| JP | 3202302 A | 9/1991 |
| JP | 51-67633 | 7/1993 |
| JP | 6182706 A | 7/1994 |
| JP | 7-222806 * | 8/1995 |
| JP | 07-227806 * | 8/1995 |
| JP | 7-227806 A | 8/1995 |
| JP | 7207826 A | 8/1995 |
| JP | 10-044113 | 2/1998 |
| JP | 11-36509 A | 2/1999 |
| JP | 11058311 A | 3/1999 |

OTHER PUBLICATIONS

Japanese Agricultural For Laminated Veneer Lumber (S-10), no date.
Japanese Agricultural Standard For Structural Laminated Veneer Lumber (S-11), no date.

* cited by examiner

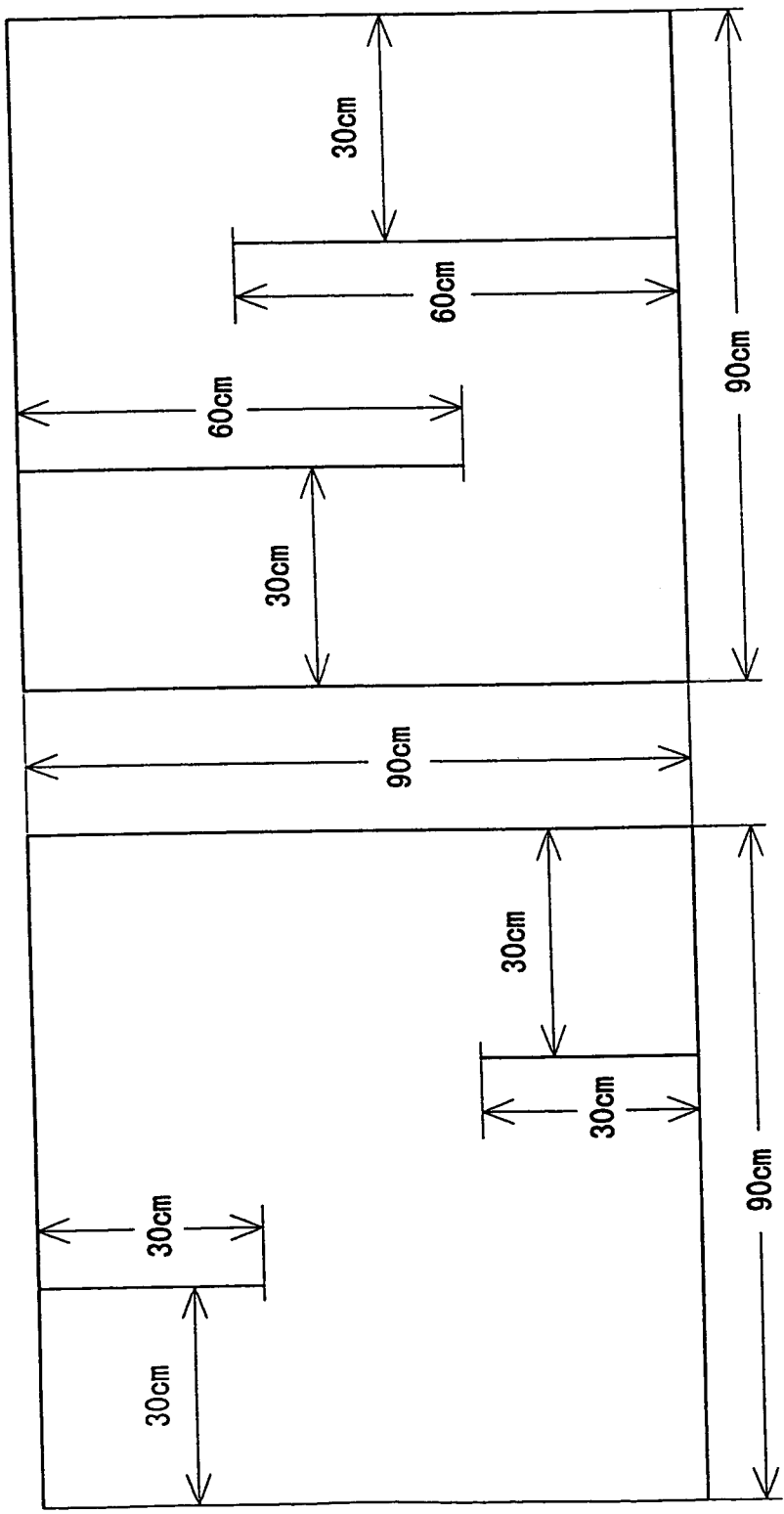

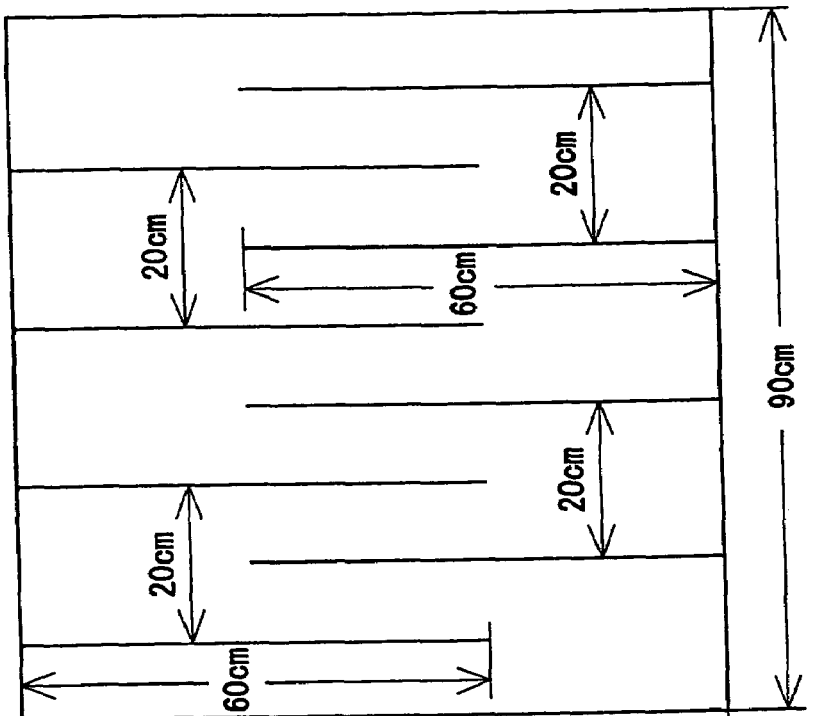
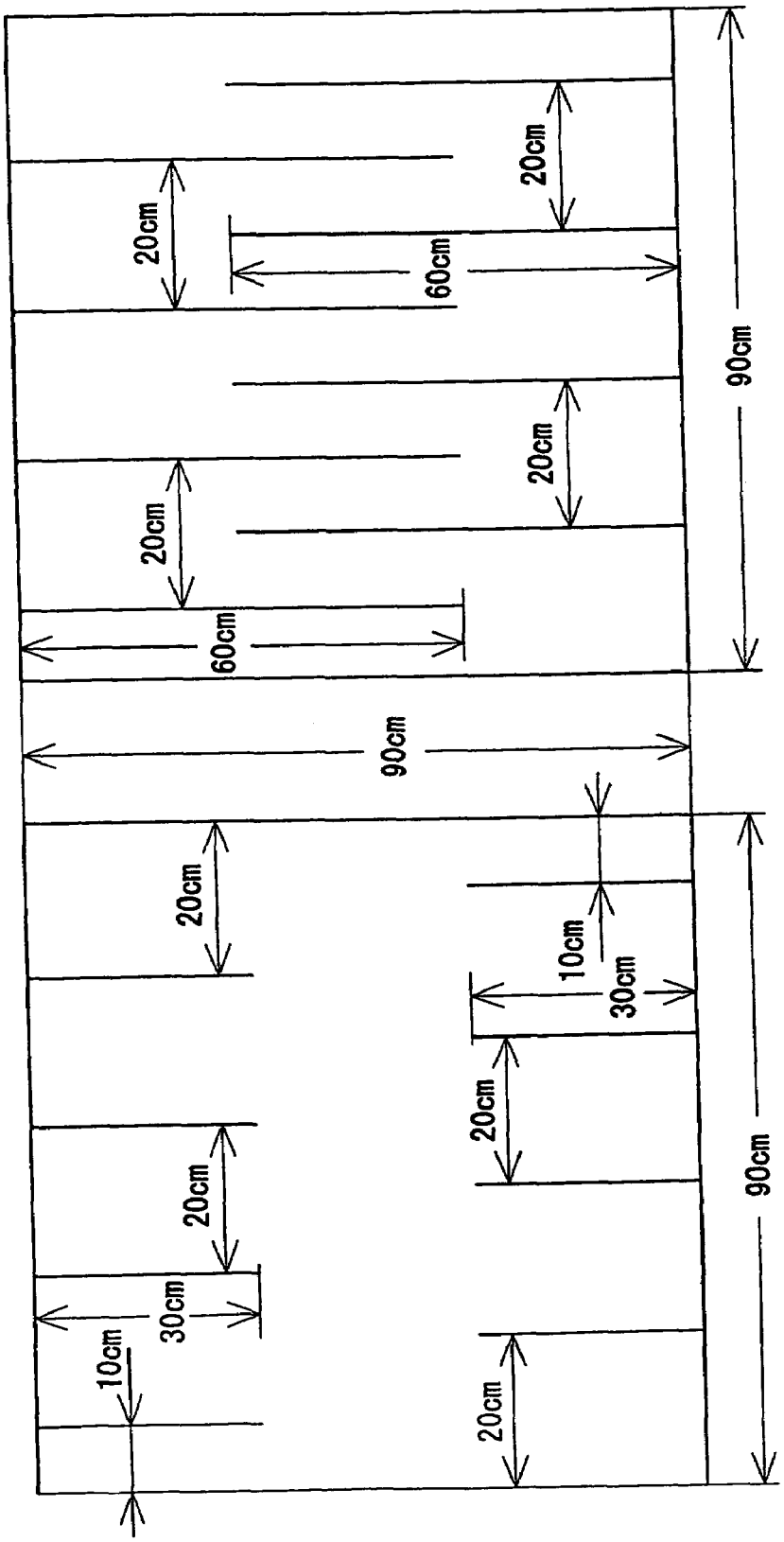

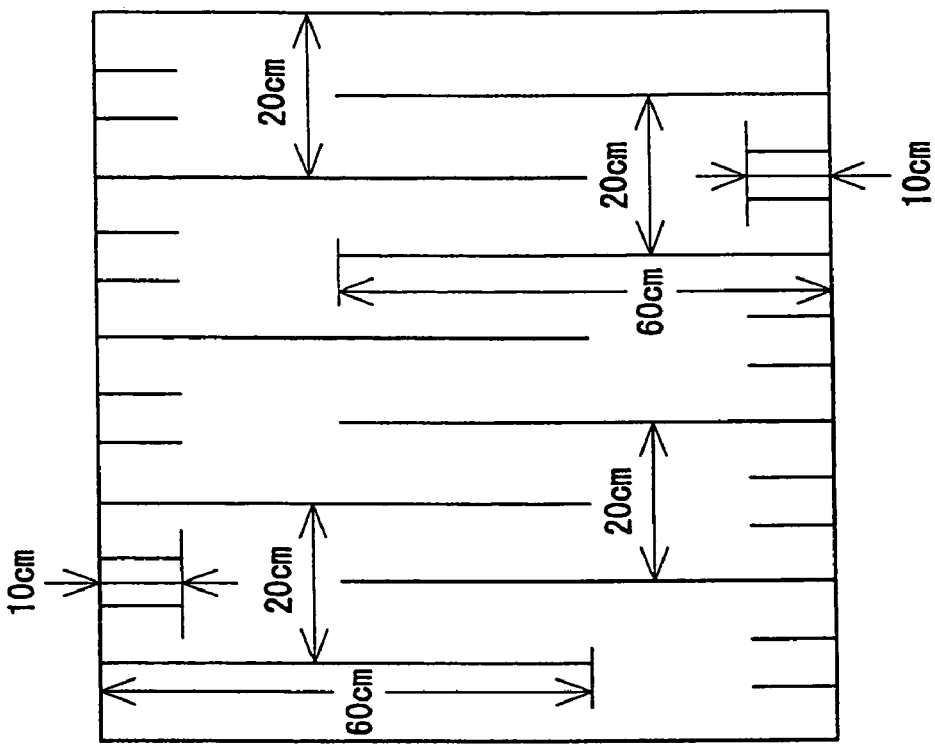
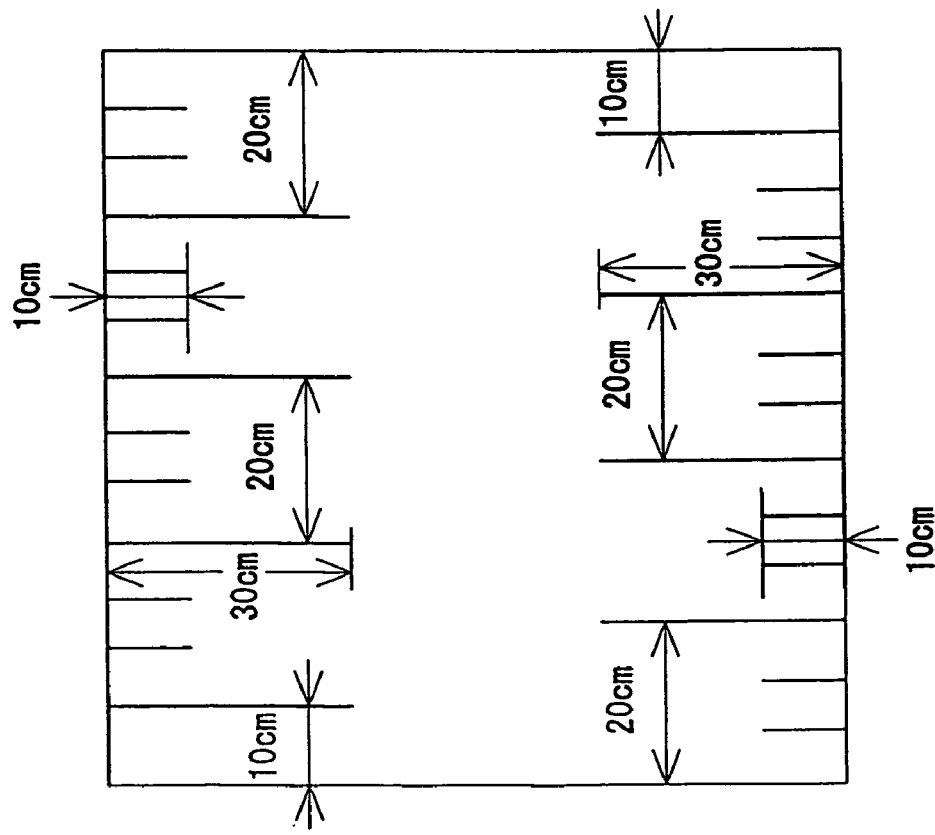
Fig. 4A
Fig. 4B

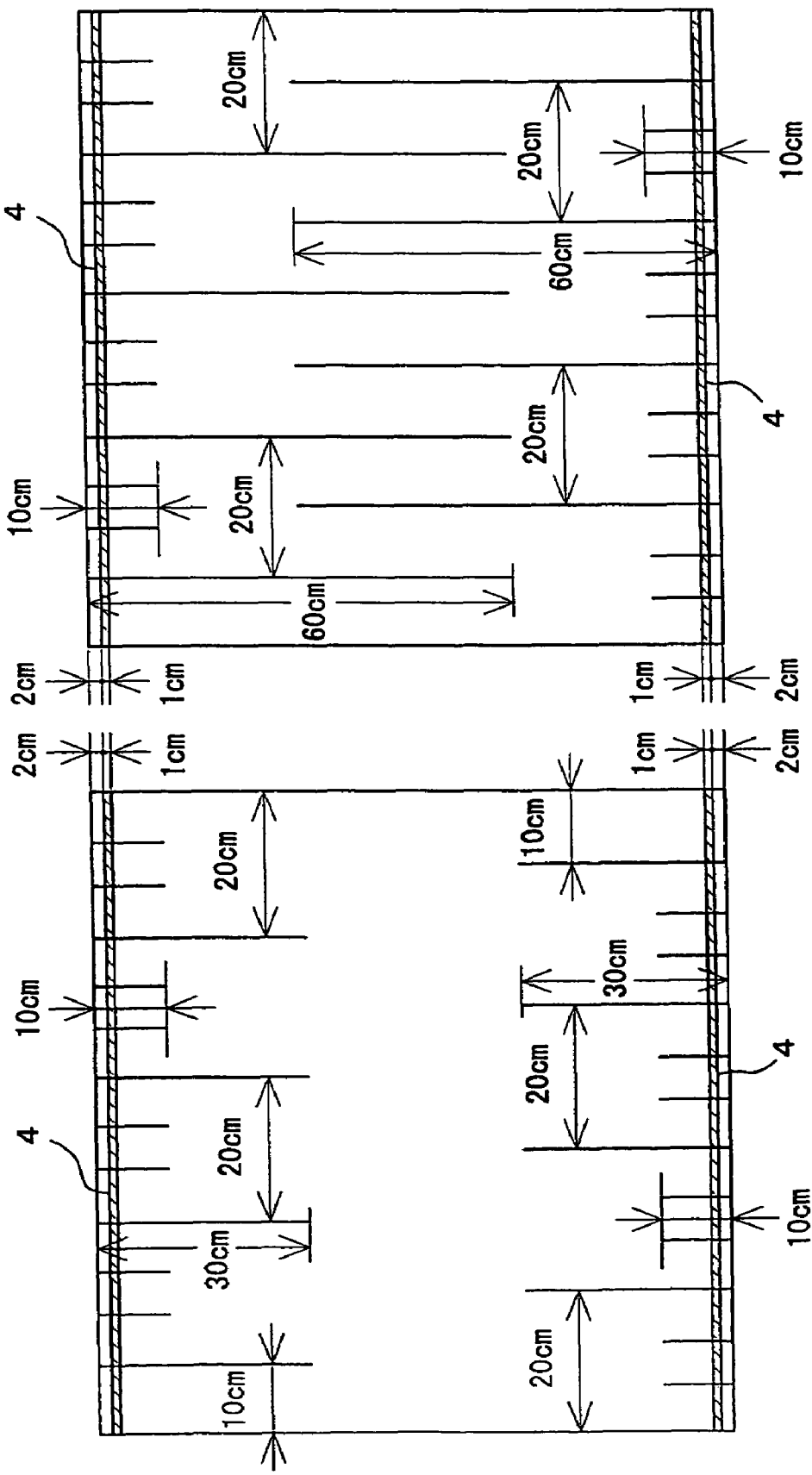

Fig. 6

| EXPERIMENT SPECIMEN | CAMBER (mm) | | | | | STRESS (×100g) | | | | | VENEER THICKNESS (mm) |
|---|---|---|---|---|---|---|---|---|---|---|---|
| | (1) | (2) | (3) | (4) | (5) | (1) | (2) | (3) | (4) | (5) | |
| 1-1 | 27 | 19 | 19 | 19 | 17 | 3 | 5 | 2 | 2 | 3 | 2.36 |
| 2 | 16 | 15 | 12 | 16 | 14 | 3 | 3 | 4 | 3 | 3 | 2.38 |
| 2-1 | 19 | 19 | 16 | 14 | 13 | 13 | 13 | 9 | 5 | 3 | 2.54 |
| 2 | 18 | 17 | 20 | 21 | 20 | 10 | 10 | 8 | 9 | 9 | 2.40 |
| 3-1 | 21 | 17 | 20 | 20 | 17 | 11 | 8 | 7 | 8 | 6 | 2.49 |
| 2 | 16 | 16 | 15 | 14 | 14 | 18 | 24 | 20 | 12 | 12 | 2.68 |
| 4-1 | 28 | 27 | 22 | 21 | 20 | 15 | 18 | 7 | 9 | 7 | 2.44 |
| 2 | 15 | 19 | 22 | 25 | 22 | 19 | 22 | 21 | 9 | 8 | 2.38 |
| 5-1 | 11 | 5 | 2 | 1 | 1 | 3 | 3 | 1 | 1 | 1 | 2.71 |
| 2 | 10 | 5 | 4 | 2 | 2 | 3 | 3 | 1 | 1 | 1 | 2.93 |
| AVERAGE | 18.1 | 15.9 | 15.2 | 15.3 | 14.0 | 9.8 | 10.9 | 8.0 | 5.9 | 5.3 | |
| RATE OF DECREASE | | 12.2% | 16.0% | 15.5% | 22.7% | | 18.4% | 39.8% | 45.9% | |
| 6-1 | 18 | 16 | 6 | 11 | 9 | 8 | 9 | 2 | 3 | 5 | 2.46 |
| 2 | 18 | 12 | 8 | 9 | 9 | 9 | 12 | 7 | 9 | 8 | 2.28 |
| 7-1 | 19 | 12 | 14 | 14 | 14 | 4 | 4 | 4 | 2 | 3 | 2.42 |
| 2 | 20 | 18 | 10 | 9 | 9 | 6 | 11 | 9 | 5 | 7 | 2.39 |
| 8-1 | 16 | 17 | 13 | 13 | 12 | 20 | 17 | 3 | 7 | 11 | 2.56 |
| 2 | 18 | 19 | 14 | 14 | 13 | 15 | 20 | 7 | 8 | 8 | 2.79 |
| 9-1 | 15 | 17 | 10 | 13 | 14 | 20 | 20 | 14 | 10 | 11 | 2.72 |
| 2 | 15 | 16 | 14 | 16 | 14 | 33 | 20 | 17 | 8 | 9 | 2.53 |
| 10-1 | 20 | 16 | 13 | 12 | 12 | 8 | 9 | 7 | 6 | 7 | 2.34 |
| 2 | 11 | 9 | 7 | 12 | 6 | 5 | 3 | 2 | 2 | 2 | 2.45 |
| AVERAGE | 17.0 | 15.2 | 10.9 | 12.3 | 11.2 | 12.8 | 12.5 | 7.2 | 6.0 | 7.1 | |
| RATE OF DECREASE | | 10.6% | 35.9% | 27.7% | 33.5% | | 2.3% | 43.7% | 53.1% | 44.5% | |

Fig.7

| SPECIMEN | | | | | | | | | | | | | | |
|---|---|---|---|---|---|---|---|---|---|---|---|---|---|---|
| 1 | LVL | F | F | F | F | F | F | F | F | F | F | F | F | F |
| 2 | LVL | R | R | R | R | R | R | R | R | R | R | R | R | R |
| 3 | LVB | F | F(R) | F | F | F | F | F | F | F | F(R) | F | F | F |
| 4 | LVB | R | F(R) | F | R | F | R | F | R | F | F(R) | F | R | R |
| 5 | LVL | F | F | F | R | R | R | R | R | R | F | F | F | F |
| 6 | LVL | R | R | R | F | F | F | F | F | F | R | R | R | R |
| 7 | LVL | F | F | F | F | F | F | F | F | F | F | F | F | F |
| 8 | PLYWOOD | L(L) | L | L(L) | L(L) | L | L(L) | L | L(L) | L | L(L) | L | L(L) | L |
| 9 | LVL | M | M | M | M | M | M | M | M | M | M | M | M | M |

F: FALCATARIA, R: RUBBER WOOD, L: JAPANESE LARCH, M: MERANTI
VENEER IN PARENTHESES: FIBER DIRECTION OF VENEER ORIENTED
AT 90 DEGREES RELATIVE TO OTHER VENEERS

Fig.8

| | SPECIFIC GRAVITY | BENDING STRENGTH (0 DEGREE) kgf/cm² | BENDING STRENGTH (90 DEGREES) kgf/cm² | YOUNG'S MODULUS OF ELASTICITY 10³ kgf/cm² | NAIL HOLDING STRENGTH kgf |
|---|---|---|---|---|---|
| SPECIMEN 1 | 0.52 | 572 | 26 | 86 | 89 |
| 2 | 0.56 | 619 | 23 | 90 | 84 |
| 3 | 0.52 | 534 | 197 | 76 | 84 |
| 4 | 0.56 | 524 | 216 | 79 | 97 |
| 5 | 0.58 | 403 | 111 | 78 | 80 |
| 6 | 0.59 | 634 | 231 | 119 | 40 |
| 7 | 0.43 | 371 | 96 | 66 | 57 |
| 8 | 0.65 | 456 | 430 | 83 | 116 |
| 9 | 0.63 | 860 | — | 165 | 106 |

LAMINATED COMPOSITE WOODEN MATERIAL AND METHOD OF MANUFACTURING MATERIAL

TECHNICAL FIELD

The present invention relates to a laminated composite lumber and a method of producing the same.

BACKGROUND ART

In the prior art, it is known to use a wood having an oven-dry specific gravity of about 0.5, such as lauan, radiata pine, Japanese larch, Japanese red pine, or Oregon pine, as a wood for producing a laminated composite lumber as a building material (see, for example, Proceedings of the 40th Anniversary Meeting of the Japan Wood Society, p.246 J3-1040-1, April 1995). A wood having an oven-dry specific gravity of 0.6 or larger not only takes time and labor to transport because it is too heavy, but also is difficult to work on because it is too hard. On the other hand, with a wood having an oven-dry specific gravity of 0.4 or less, it is difficult to secure the desired bending strength and nail holding power. Accordingly, in the case of timbers from South East Asia, only specific kinds of trees, such as lauan, have been logged and used extensively, and as a result, tropical timber trees are being rapidly depleted, this being one of major causes for destruction of natural environments.

DISCLOSURE OF THE INVENTION (Technical Problem to be Solved by the Invention)

It is an object of the present invention to provide a laminated composite lumber that is light in weight, is substantially resistant to warping and distortion, and yet retains the desired bending strength and nail holding power, by using wood, in particular, wood from South East Asia, that have been difficult to be used as building materials. It is also an object of the invention to provide a method of producing such a laminated composite lumber.

(Method of Solving the Problem and Advantageous Effects Over Prior Art)

To achieve the above object, a laminated composite lumber according to the present invention is constructed by stacking a veneer whose oven-dry specific gravity is 0.6 or larger alternately with a veneer whose oven-dry specific gravity is 0.4 or less, and by bonding them together to construct a structure identical to a laminated veneer lumber. According to the present invention, when the veneer whose oven-dry specific gravity is 0.6 or larger and the veneer whose oven-dry specific gravity is 0.4 or less are stacked in alternating fashion and bonded together, the weak points of one material can be compensated for by the strong points of the other, and a laminated composite lumber can thus be produced that is light in weight, is substantially resistant to warping and distortion, and yet retains the desired bending strength and nail holding power.

In particular, when the veneer whose oven-dry specific gravity is 0.6 or larger is made of rubber wood, and the veneer whose oven-dry specific gravity is 0.4 or less is made of falcataria, the deformation of the rubber wood caused by the absorption and desorption of moisture is absorbed and mitigated by the falcataria. Accordingly, special work such as forming slits in the veneers is not needed, and by just laminating together the veneers using existing equipment, a laminated composite lumber can be obtained that is substantially resistant to warping and distortion and that can serve practical purposes.

In one preferred mode of the present invention, the veneers are stacked together, by orienting a fiber direction of at least one of the veneers at right angles to the fiber direction of the other veneers. According to this mode of the invention, the veneer oriented at right angles to the fiber direction of the other veneers works to improve the bending strength in a direction at right angles to the fiber direction, thus serving to reduce the directionality of the laminated composite lumber.

In another preferred mode of the present invention, outermost layers forming top and bottom surface are each formed from a veneer whose oven-dry specific gravity is 0.6 or larger. According to this mode of the invention, the bending strength improves since the outermost layers are each formed from the veneer having a large tensile strength.

In still another preferred mode of the present invention, a plurality of slits are formed in staggered fashion in opposite cut-end edge portions of the veneer whose oven-dry specific gravity is 0.6 or larger. According to this mode of the invention, by forming the slits in staggered fashion, internal stress can be alleviated, and the occurrence of the so-called warping or distortion can thus be suppressed.

In a further preferred mode of the present invention, the length of each slit is longer than one half of the length of the veneer. According to this mode of the invention, since each slit is formed so that its tip extends beyond the centerline of the veneer, the occurrence of the so-called warping or distortion can be further effectively suppressed.

A method of producing a laminated composite lumber, according to the present invention, comprises the steps of: forming a plurality of slits in staggered fashion in opposite cut-end edge portions of a veneer whose oven-dry specific gravity is 0.6 or larger; holding together each of the cut-end edge portions by means of an adhesive tape; and thereafter stacking in at least three layers the veneer whose oven-dry specific gravity is 0.6 or larger alternately with a veneer whose oven-dry specific gravity is 0.4 or less and bonding them together. According to the invention, by holding together each of the slit-containing cut-end edge portions by means of an adhesive tape, a veneer can be obtained that has a reduced camber and that is easy to handle during production work. This offers the effect of achieving a method of producing a laminated composite lumber having excellent workability.

BRIEF DESCRIPTION OF THE DRAWINGS

FIG. 2 shows specimens used in Experiment 2 in accordance with Example 1: FIG. 2A shows a plan view of specimens 1 to 5, and FIG. 2B shows a plan view of specimens 6 to 10.

FIG. 3 shows specimens used in Experiment 3 in accordance with Example 1: FIG. 3A shows a plan view of specimens 1 to 5, and FIG. 3B shows a plan view of specimens 6 to 10.

FIG. 4 shows specimens used in Experiment 4 in accordance with Example 1: FIG. 4A shows a plan view of specimens 1 to 5, and FIG. 4B shows a plan view of specimens 6 to 10.

FIG. 5 shows specimens used in Experiment 5 in accordance with Example 1: FIG. 5A shows a plan view of specimens 1 to 5, and FIG. 5B shows a plan view of specimens 6 to 10.

FIG. 6 is a table showing measured results in Experiments 1 to 5.

FIG. 7 is a table showing conditions for experiments in accordance with Example 2.

FIG. 8 is a table showing measured results in accordance with Example 2.

FIG. 10 shows measured results in Experiment 6:

FIG. 12 shows measured results in Experiment 7.

BEST MODE FOR CARRYING OUT THE INVENTION

Figure 1:
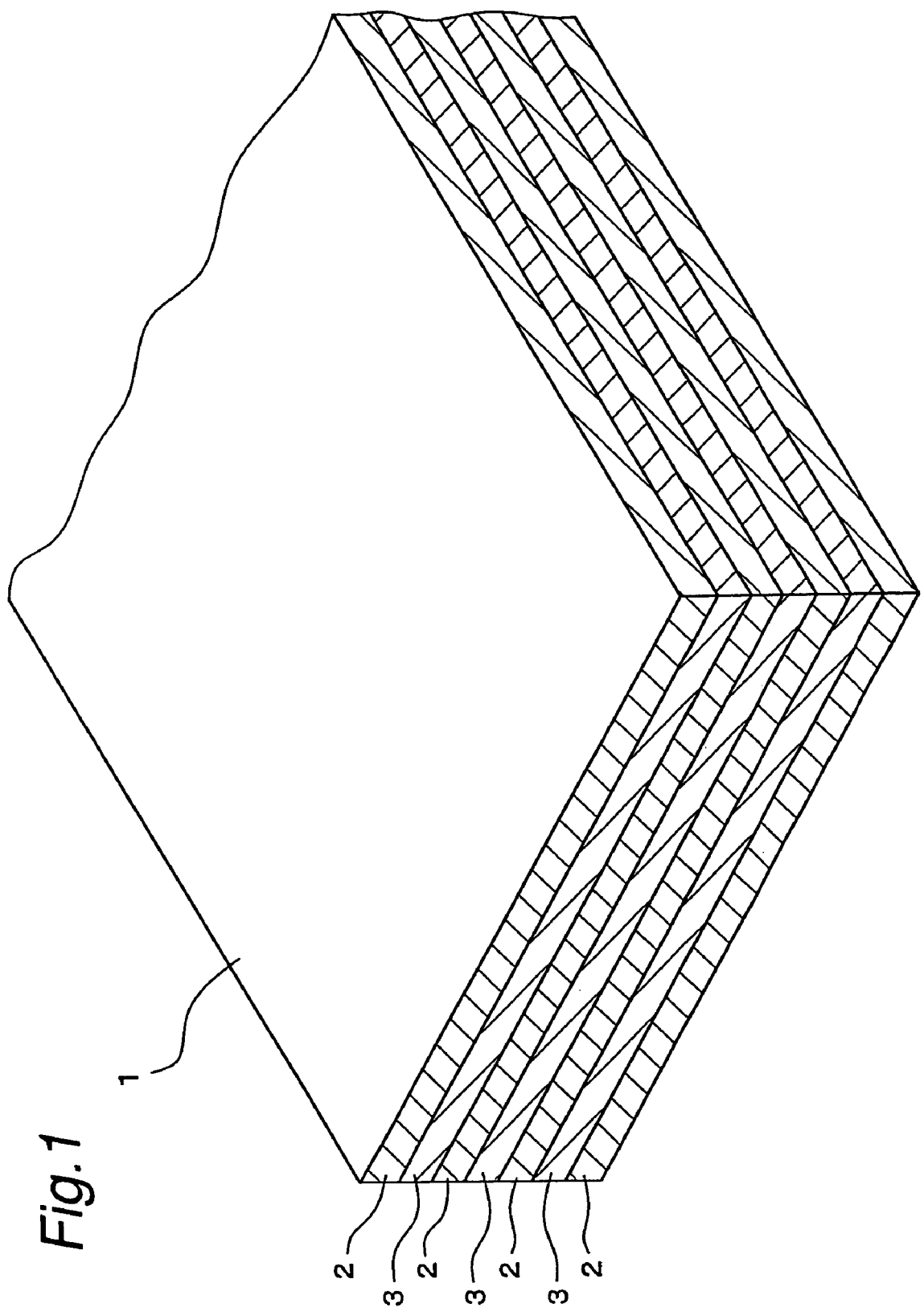
FIG. 1 is a cross-sectional perspective view showing a composite lumber according to the present invention.

The best mode according to the present invention will be described with reference to FIG. 1.

This mode concerns a seven-layered laminated composite lumber 1 constructed by stacking veneers 2, whose oven-dry specific gravity is 0.6 or larger, alternately with veneers 3, whose oven-dry specific gravity is 0.4 or less, and by bonding them together.

Wood species for the veneers whose oven-dry specific gravity is 0.6 or larger include, for example, rubber wood (oven-dry specific gravity: 0.65), keruing (oven-dry specific gravity: 0.74), kapur (oven-dry specific gravity: 0.70), selangan batu (oven-dry specific gravity: 0.94), bintangor (oven-dry specific gravity: 0.66), calophyllum (oven-dry specific gravity: 0.72), and kempas (oven-dry specific gravity: 0.87); these may be used alone or in combination.

Of these wood species, the rubber wood is heavy and small in diameter and, in many cases, the logs are curved. As a result, straight log having a length of about two meters is not easily available, and it has been difficult to use the rubber wood as a building material. Further, when stored in the form of green wood for a long period of time, the wood, whether in the form of logs or products, easily decays. Furthermore, there are scattered tension wood in veneer depending on the nature of the timber tree, and when the veneer is dried, a significant amount of warping or distortion occurs; as a result, it has been difficult to end-join veneers to a required length, and the production yield has therefore been low.

However, rubber trees are planted and grown extensively in South East Asia to extract rubber sap from them. Since rubber trees are cut down after about 25 years when the rubber trees become no longer able to produce the rubber sap, a large amount of logs can be obtained continually and stably. Furthermore, the rubber wood has a white wood portion, exhibits excellent bending strength and nail holding power, and has a hard and smooth surface. Accordingly, if a veneer is produced by peeling the rubber wood using a rotary veneer lathe, and is used in combination with other veneers, as in the above mode of the invention, the earlier described problem can be solved.

In the case of the veneers whose oven-dry specific gravity is 0.6 or larger, two or more slits may be formed in staggered fashion in both cut-end edge portions of the wood sheet. The reason for forming at least two slits in each cut-end edge portion is that if only one slit is formed in each cut-end edge portion, it is difficult to reduce the camber of the veneer, and as a result, the internal stress cannot be reduced effectively. It is also preferable that each slit has a length such that its tip extends beyond the centerline of the veneer. If the slit is short with its tip not extending beyond the centerline, the occurrence of distortion in the veneer cannot be sufficiently suppressed.

The wood species for the veneers whose oven-dry specific gravity is 0.4 or less include, for example, balsa (oven-dry specific gravity: 0.16), paulownia (oven-dry specific gravity: 0.29), falcataria (oven-dry specific gravity: 0.34), amberoi (oven-dry specific gravity: 0.40), jelutong (oven-dry specific gravity: 0.37), pulai (oven-dry specific gravity: 0.44), and basswood (oven-dry specific gravity: 0.38); these may be used alone or in combination.

Of these wood species, falcataria has a relatively low bending strength and low Young's modulus of elasticity, and it not only has low nail and screw holding power, but tends to decay if stored in the form of green wood. As a result, falcataria has only been used as core materials of certain kinds of furniture, and no use has been made as a building material. However, falcataria has the characteristics that it is light in weight and homogeneous in quality and is soft and easy to work on, and that it does not easily break when a nail is driven into it. Furthermore, falcataria can be harvested about five years after it was planted, and can be grown across the whole area of South East Asia including Indonesia, Malaysia, and the Philippines. Moreover, falcataria has a primarily white wood portion, and has the feature that it not only matches the needs of consumers but is easy to handle as there is no danger of thorns sticking. Accordingly, if the characteristics of falcataria are combined, for example, with the characteristics of the rubber wood described above, an ideal building material can be obtained.

When stacking the veneers in alternating fashion, it is preferable that the veneers having the larger specific gravity are stacked alternately with the veneers having the smaller specific gravity; here, the veneers may be stacked with their fiber directions oriented parallel to each other or at right angles, and various combinations can be suitably selected as needed.

Adhesive materials for bonding the stacked veneers together include, for example, phenol-based adhesive, melamine-based adhesive, and isocyanate-based adhesive these materials can be used alone or in combination.

The outermost layers on the upper and lower surfaces may be formed from the veneers 2 whose oven-dry specific gravity is 0.6 or larger or the veneers 3 whose oven-dry specific gravity is 0.4 or less, whichever can be suitably selected as needed.

EXAMPLE 1

Rubber wood from the Sumatra in Indonesia was peeled using a rotary lathe to a thickness of 2.5 mm to obtain a veneer with a length of 90 cm and a width of 90 cm. Next, the veneer was dried in a drier to reduce the moisture content to 5 to 8%. Then such veneers were prepared and designated as specimens 1 to 10.

(Experiment (1))

On each of the veneers designated as specimens 1 to 10, a mark was put on the portion where the largest warp occurred between both cut ends, and the magnitude of the camber was measured. Next, a cup with a bottom diameter of 63 mm was placed on the mark, and a weight was put in the cup; then, the weight with which the camber was reduced to 1 mm or less and remained stationary was measured as a value representing the internal stress contained in the veneer. The measured results are shown in FIG. 6. In FIG. 6, specimen 1-1 and 2, for example, show the internal stresses being exerted on the respective cut ends of the specimen 1.

(Experiment (2))

On each of the veneers designated as specimens 1 to 5, a slit of length 30 cm was cut, as shown in FIG. 2A, along a line spaced 30 cm apart from each of the opposite ends in such a manner that the slit did not overlap the measuring point, and the weight was measured as the internal stress of the veneer in the same manner as described above. The measured results are shown in FIG. 6.

Likewise, on each of the veneers designated as specimens 6 to 10, a slit of length 60 cm was cut, as shown in FIG. 2B, along a line spaced 30 cm apart from each of the opposite ends in such a manner that the slit did not overlap the measuring point, and the weight was measured as the internal stress of the veneer in the same manner as described above. The measured results are shown in FIG. 6.

(Experiment (3))

On each of the specimens 1 to 5 used in Experiment (2), slits of length 30 cm were cut at intervals of 20 cm, as shown in FIG. 3A, and the weight was measured in the same manner as described above. The measured results are shown in FIG. 6.

Likewise, on each of the specimens 6 to 10 used in Experiment (2), slits of length 60 cm were cut at intervals of 20 cm, as shown in FIG. 3B, and the weight was measured in the same manner as described above. The measured results are shown in FIG. 6.

(Experiment (4))

On each of the specimens 1 to 5 used in Experiment (3), two slits of length 10 cm were cut at equally spaced intervals, as shown in FIG. 4A, between the respective slits cut at intervals of 20 cm, and the weight was measured in the same manner as described above. The measured results are shown in FIG. 6.

Likewise, on each of the specimens 6 to 10 used in Experiment (3), two slits of length 10 cm were cut at equally spaced intervals, as shown in FIG. 4B, between the respective slits cut at intervals of 20 cm, and the weight was measured in the same manner as described above. The measured results are shown in FIG. 6.

(Experiment (5))

While pressing the edges of the cut ends of each of the slit-containing specimens 1 to 5 used in Experiment (4), an adhesive tape of width 1 cm was applied along a line spaced 2 cm apart from the edge of each cut end, as shown in FIG. 5A, and the weight was measured in the same manner as described above. The measured results are shown in FIG. 6.

Likewise, while pressing the edges of the cut ends of each of the slit-containing specimens 6 to 10 used in Experiment (4), an adhesive tape 4 of width 1 cm was applied along a line spaced 2 cm apart from the edge of each cut end, as shown in FIG. 5B, and the weight was measured in the same manner as described above. The measured results are shown in FIG. 6.

As can be seen from FIG. 6, the magnitude of the camber was reduced by about 15% for the specimens 1 to 5 in Experiments 2, 3, and 4. By contrast, in the case of the specimens 6 to 10, while the rate of decrease was about 10% in Experiment 2, the rate of decrease was about 36% in Experiment 3 and about 28% in Experiment 4, thus exhibiting a sharp decrease. In Experiment 5 where the adhesive tapes were applied, the rate of decrease somewhat increased in the case of the specimens 1 to 5, but no appreciable change in the rate of decrease was observed in the case of the specimens 6 to 10.

According to the measured results of the stress in Experiment 2 where only one slit was formed in each of the opposite cut-end edge portions, no decrease in the stress was observed. However, it was found that when a plurality of slits were formed in staggered fashion in the opposite cut-end edge portions, as in the specimens 1 to 10 in Experiments 3 and 4, the stress decreased sharply. In particular, in Experiments 3 and 4, the rate of decrease was greater for the specimens 6 to 10 than for the specimens 1 to 5, that is, the internal stress was greatly reduced for the specimens 6 to 10.

Further, in all the Experiments, the rate of decrease of the camber and the rate of decrease of the internal stress in the specimens 1 to 5 were the greatest in Experiment 5 where each of the slit-containing cut-end edge portions was held together by the adhesive tape 4. In the case of the specimens 6 to 10, on the other hand, the rate of decrease of the camper was generally greater than in Experiment 4, but the rate of decrease of the internal stress was generally smaller than in Experiment 4.

From the above measured results, it was found that when a plurality of slits are formed in staggered fashion in the opposite cut-end edge portions, the camber and the stress can be effectively reduced.

In particular, it was found that when each slit is formed long enough to extend beyond the centerline of the veneer, the camber and the stress can be further effectively reduced.

Further, when the slits are formed, the internal stress is relieved, and warping and distortion occur, but by applying an adhesive tape to each of the cut-end edge portions, each of the cut-end edge portions can be held together while reducing the internal stress. As a result, when joining veneers together by means of a scarf joint, for example, the veneers can be easily inserted in the machine tool, and this serves to enhance workability. Furthermore, since the internal stress of each veneer is reduced, the veneers do not easily separate once they are joined together, and the durability thus increases. In particular, in the present invention, slits are only formed in the cut-end edge portions, and the cell walls of the wood material are not destroyed; it can therefore be seen that the bending strength does not appreciably decrease.

EXAMPLE 2

Veneers respectively made of falcataria (F), rubber wood (R), Japanese larch (L), and meranti (M), each 2.5 mm in thickness, were stacked in the order shown in FIG. 7, and were bonded together using an alkaline phenol-based adhesive (type I/FC0/insecticide-contained) to construct a laminated composite lumber measuring 28 mm in thickness, 910 mm in width, and 1820 mm in length, from which specimens 1 to 9 were cut. Each of the specimens 1 to 9 had outer dimensions that conform to the JAS test method for structural laminated veneer lumber.

In FIG. 7, the veneers in parentheses are those that were stacked with their fiber direction oriented at right angles to the fiber direction of the other veneers. Various measurements were made on the specimens 1 to 9. The measured results are shown in FIG. 8. In FIG. 8, bending strength (0 degree) refers to the bending strength of each specimen when the specimen is bent along the fiber direction, while bending strength (90 degrees) refers to the bending strength of each specimen when the specimen is bent along a direction at right angles to the fiber direction. Further, nail pulling strength indicates the force required to pull a nail (N50) straight upward from the specimen after the nail has been driven 40 mm punching through the specimen.

As can be seen from FIG. 8, the bending strength (0 degree) of each of the specimens 1 to 4 according to the present invention is greater than the bending strength (0 degree) of the specimen 8, a plywood of Japanese larch, and suffices for practical purposes. On the other hand, the bending strength (90 degrees) of each of the specimens 1 to 4 is far smaller than the bending strength (90 degree) of the specimen 8, a plywood of Japanese larch, but when their applications are limited, there will be no practical problem.

Further, the nail pulling resistance of each of the specimens 1 to 4 is smaller than that of the specimen 8, but there is no practical problem as long as the nail pulling strength is greater than 80 kgf.

As can be seen from the results of the experiments in Examples 1 and 2, when slits are formed in the veneers, the camber and the internal stress both decrease. It is also clear that when veneers having different specific gravities are stacked in alternating fashion and bonded together, the bending strength and the nail holding power both improve. Thus, it has been found that when slits are formed in the veneers having the larger specific gravity, and the veneers having the larger specific gravity and the veneers having the smaller specific gravity are stacked in alternating fashion and bonded together, the resulting laminated composite lumber has good bending strength and nail holding power, is light in weight, and is substantially resistant to warping and distortion.

EXAMPLE 3

Veneers respectively made of rubber wood (R) and falcataria (F), each measuring 2.5 mm in thickness, 40 mm in width, and 1200 mm in length, were stacked one on top of another in alternating fashion, with the top and bottom surfaces each covered by a veneer of rubber wood, and a total of 13 veneers were bonded together using an alkaline phenol-based adhesive (type I/FC0/insecticide-contained). The thus constructed laminated composite lumber, measuring 29 mm in thickness, 40 mm in width, and 1200 mm in length, was cut into three pieces, producing three test specimens each having a thickness of 29 mm, a width of 40 mm, a length 350 mm, and an average density of 566 kg/m³.

EXAMPLE 4

Veneers respectively made of rubber wood (R) and falcataria (F), the same ones as those used in Example 3, were stacked one on top of another in alternating fashion, with the top and bottom surfaces each covered by a veneer of falcataria, and the same processing as that in Experiment 3 was applied to produce three test specimens each having a thickness of 29 mm, a width of 40 mm, a length 350 mm, and an average density of 551 kg/m³.

COMPARATIVE EXAMPLE 1

Veneers made of rubber wood (R) (a total of 13 veneers), each being the same as the corresponding one used in Example 3, were stacked one on top of another, and the same processing as that in Experiment 3 was applied to produce three test specimens each having a thickness of 29 mm, a width of 40 mm, a length 350 mm, and an average density of 719 kg/m³.

COMPARATIVE EXAMPLE 2

Veneers made of falcataria (F) (a total of 13 veneers), each being the same as the corresponding one used in Example 3, were stacked one on top of another, and the same processing as that in Experiment 3 was applied to produce three test specimens each having a thickness of 29 mm, a width of 40 mm, a length 350 mm, and an average density of 378 kg/m³.

(Experiment (6))

The degree of deformation was measured on each of the specimens produced in Examples 3 and 4 and Comparative examples 1 and 2 described above.

Figure 9:
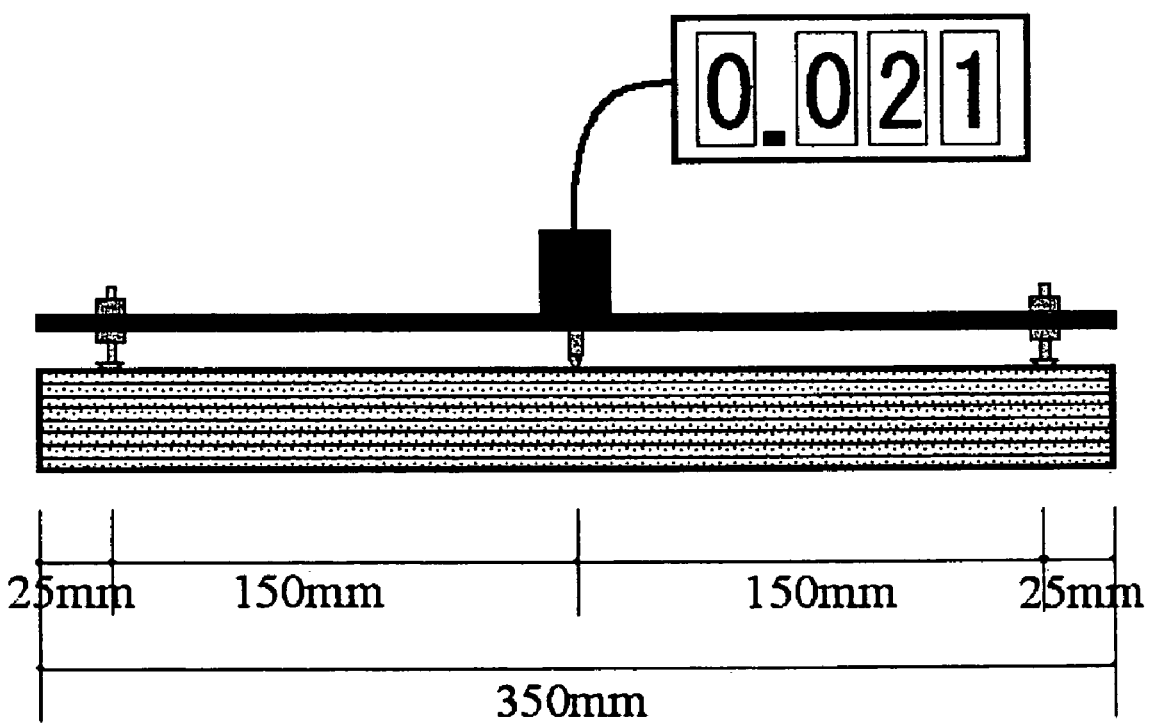
FIG. 9 is a schematic diagram showing a measuring method used in Experiment 6 for Examples 3 and 4 and Comparative examples 1 and 2.

More specifically, the specimens produced in Examples 3 and 4 and Comparative examples 1 and 2 were sufficiently conditioned in a thermo-hygrostat (20° C., 60% RH), after which the weight of each specimen was measured; at the same time, the amount of warp (deflection) was measured in an air-dry condition by using a sensor arranged as shown in FIG. 9. Next, after drying the specimens for two days at a temperature of 60° C., the weight of each specimen was measured again, and the amount of change of warp was measured using the same sensor. Here, a deformation convex upward was taken as positive, and a deformation concave downward as negative.

Figure 10A:
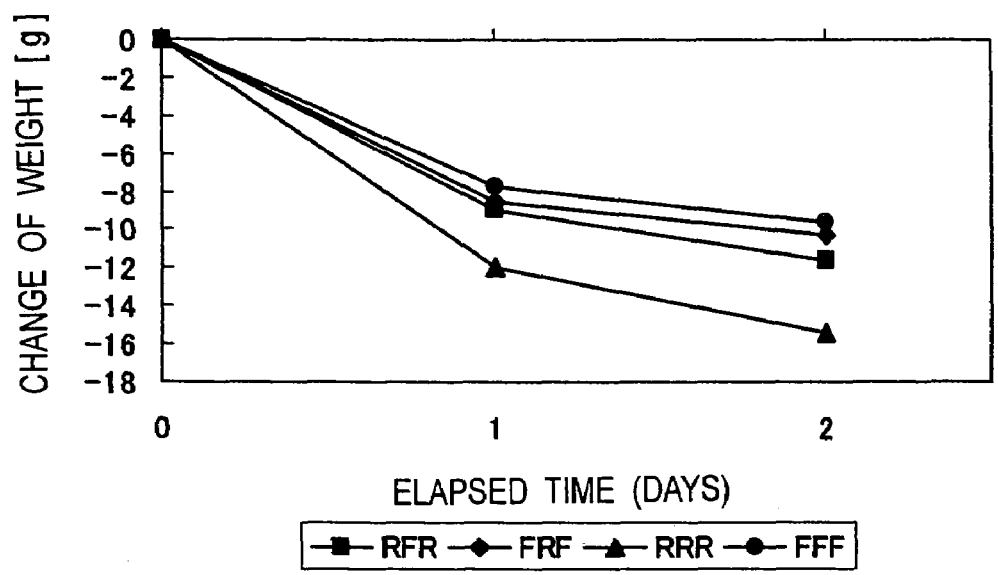
FIG. 10A is a graph showing the change of weight of specimens.

As can be seen from FIG. 10A, the amount of moisture desorption is the largest for the rubber-wood-only specimens having a large density (Comparative example 1 designated "RRR" in the figure) and the smallest for the falcataria-only specimens (Comparative example 2 designated "FFF" in the figure). It is also shown that the specimens in Example 3 (designated "RFR" in the figure) and the specimens in Example 4 (designated "FRF" in the figure), each being a composite lumber made of rubber wood and falcataria, have characteristics intermediate between the two comparative examples but closer to the falcataria-only specimens (Comparative example 2).

Figure 10B:
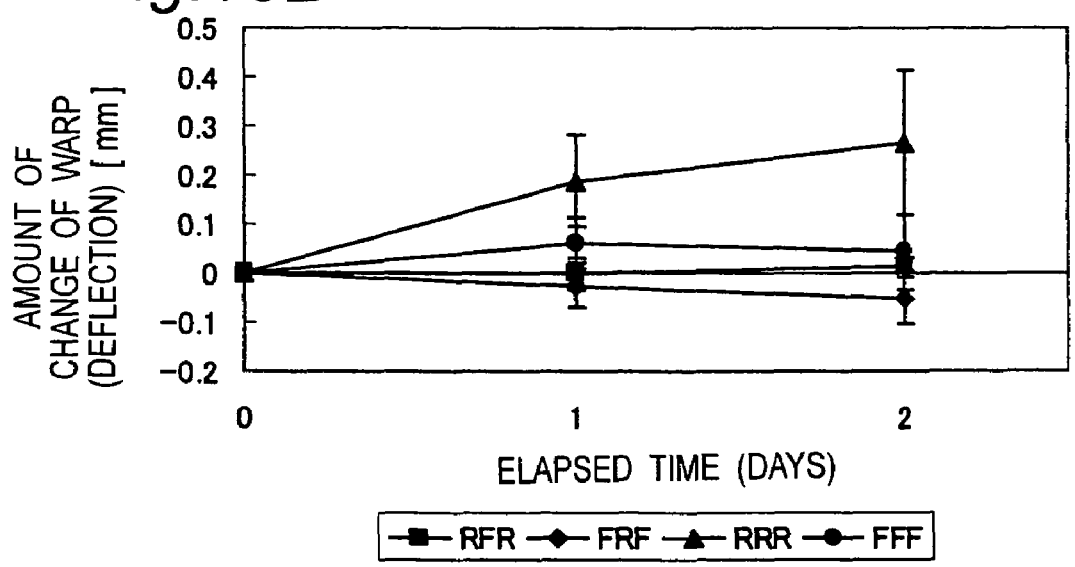
FIG. 10B is a graph showing the change of warp (deflection) of specimens.

Further, as can be seen from FIG. 10B, the amount of change of warp is the largest for the rubber-wood-only specimens (Comparative example 1), and some of the specimens were twisted. On the other hand, the amount of change of warp is extremely small for the falcataria-only specimens (Comparative example 2), and it has been found that the specimens produced from the composite of falcataria and rubber wood (Example 3) exhibit the smallest amount of change of warp. It is also shown that the amount of change of warp in Example 4 is substantially the same in magnitude as that of the falcataria-only specimens.

The measured results shown above reveal that the specimens in Examples 3 and 4, each produced from the composite of falcataria and rubber wood, are less prone to warping when dried, than the rubber-wood-only specimens in Comparative example 1.

(Experiment (7))

The change over time of the warping caused by moisture absorption was measured on each of the specimens produced in Examples 3 and 4 and Comparative examples 1 and 2 described above.

Figure 11:
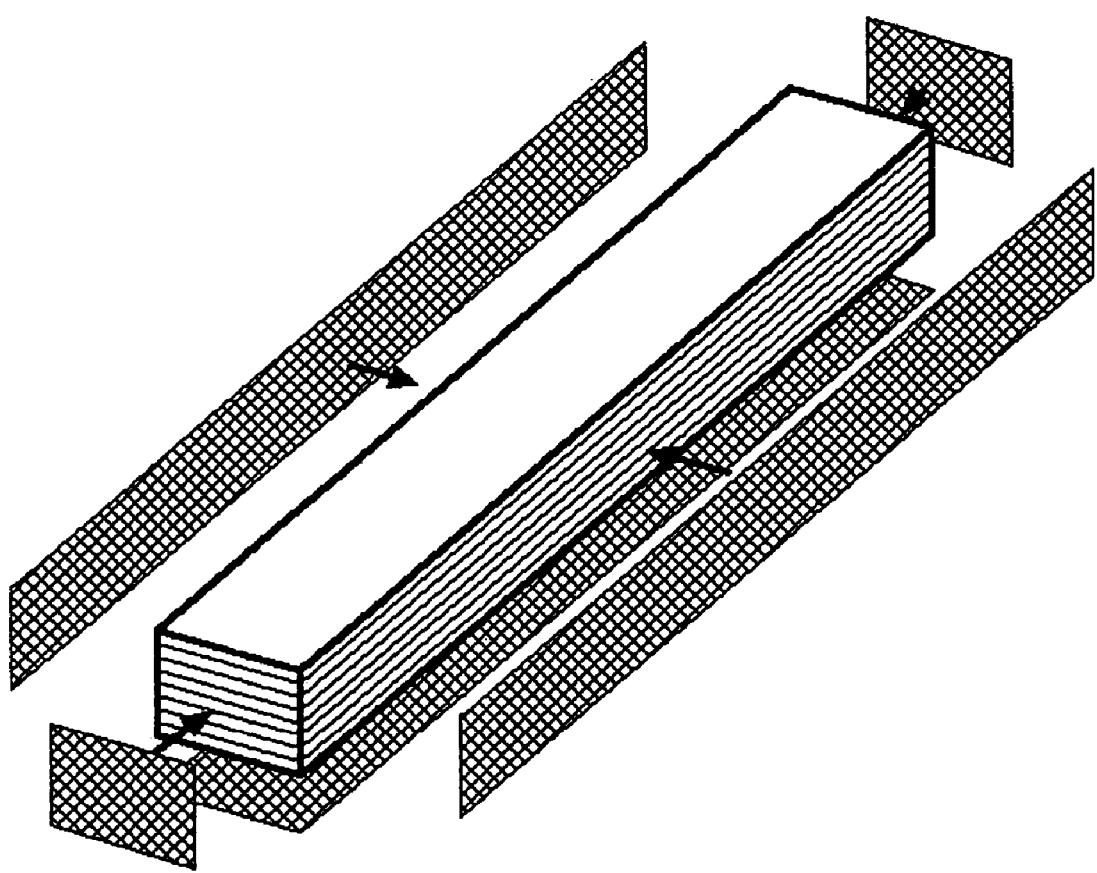
FIG. 11 is an exploded perspective view showing a specimen in accordance with Examples 3 and 4 and Comparative examples 1 and 2, used in Experiment 7.

More specifically, the specimens were dried for two days at a temperature of 60° C., and then dried for three days in a desiccator in which $CaCl_2$ was placed. Then, petrolatum was applied to the side and bottom faces of two specimens of each type, and aluminum foils were attached to seal the respective faces, as shown in FIG. 11. The remaining one specimen of each type was left as-is.

Figure 12A:
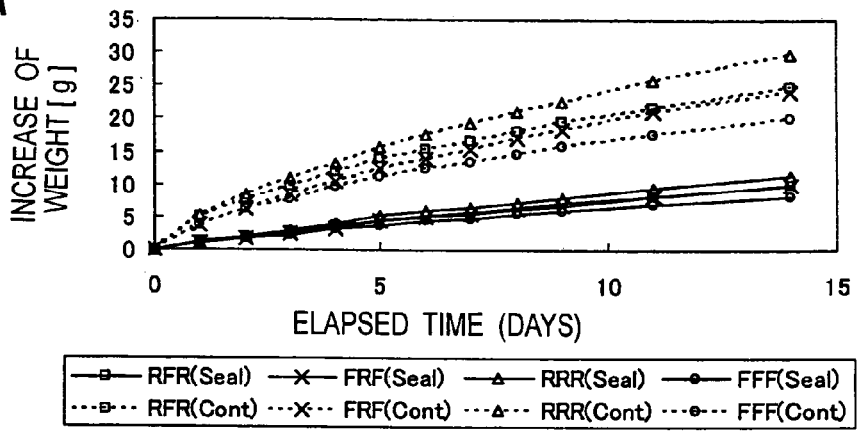
FIG. 12A is a graph showing the change of weight of specimens.
Figure 12B:
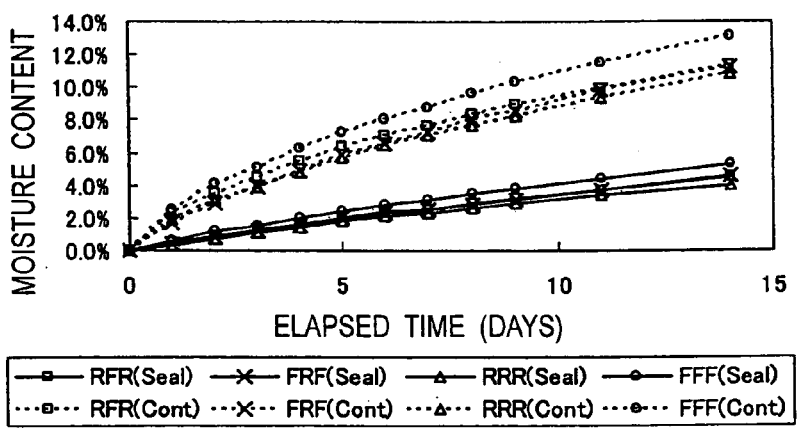
FIG. 12B is a graph showing the change of moisture content of specimens.
Figure 12C:
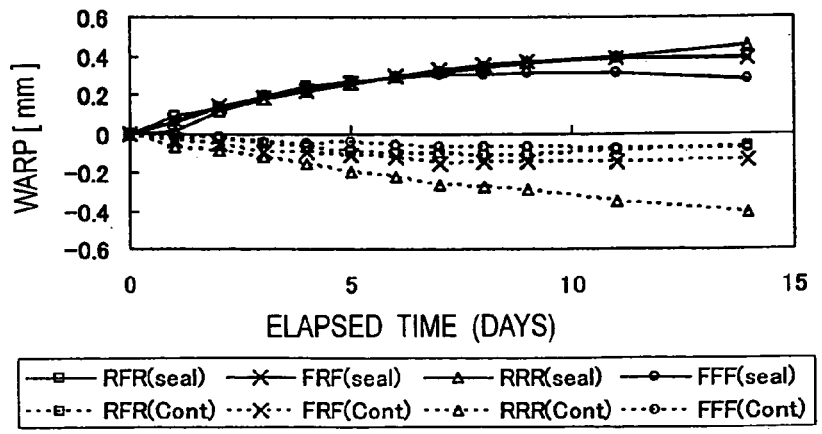
FIG. 12C is a graph showing the change of warp (deflection) of specimens.

Then, each specimen was arranged in the desiccator (temperature 20° C.) in which water was placed, causing the specimen to absorb moisture, and the change of weight, the moisture content, and the amount of warping were measured. The measured results are shown in FIGS. 12A, 12B, and 12C, respectively. The measured results for the sealed specimens show average values. The amount of warping was measured with the unsealed face facing upward, and a deformation convex upward was taken as position and a deformation concave downward as negative.

As can be seen from FIG. 12A, it has been found that, between the sealed specimens (labeled "Seal" in the figure) and the unsealed specimens (labeled "Cont" in the figure), the amount of moisture absorption is smaller for the sealed specimens than for the unsealed specimens, because the moisture absorbing face is limited to only one flat grain face in the former case. It has also been found that a specimen having a greater specific gravity (greater solid volume) exhibits a faster rate of moisture absorption.

As can be seen from FIG. 12B, it has been found that the amount of change of the moisture content is the largest for the falcataria-only specimens of Comparative example 2 whose specific gravity is small, whether sealed or not sealed, while in the case of the rubber-wood/falcataria composites (Examples 3 and 4), the amount of change is more or less closer to that of the rubber-wood-only specimens of Comparative example 3.

As can be seen from FIG. 12C, the amount of change of warp shows an upward convex deformation for all the sealed specimens, because moisture is absorbed only from the top face. The amount of warping is the smallest for the falcataria-only specimens (Comparative example 2), the deformation reaching its peak in the ninth day and decreasing thereafter. In the case of the falcataria/rubber-wood composites (Examples 3 and 4), the amount of change of warp after the ninth day is small, while in the case of the rubber-wood-only specimens (Comparative example 1), the specimens continue to warp even after 14 days have passed, and the amount of change of the warp is the largest.

On the other hand, the unsealed specimens exhibited a downward concave deformation, and it was found that, except the rubber-wood-only specimen of Comparative example 1, the specimens of the other three types exhibited hardly any change from the seventh day onward. Furthermore, the specimen of Comparative example 1 not only exhibits the largest amount of warp, but continues to warp even after 14 days have passed.

Accordingly, as can be seen from Experiments 6 and 7, the deformation due to moisture absorption and desorption is extremely large in the case of the rubber-wood-only specimens of Comparative example 1, while the deformation is small in the case of the falcataria-only specimens of Comparative example 2. It has also been found that the specimens of Examples 3 and 4 constructed from rubber-wood/falcataria composites exhibit behaviors intermediate between those of Comparative examples 1 and 2.

(Experiment (8))

Strain distributions were analyzed on the specimens of Example 4 and Comparative example 1 by using a digital image correlation method.

More specifically, the specimens were dried for two days at a temperature of 60° C., and then dried for three days in a desiccator in which $CaCl_2$ was placed. Then, petrolatum was applied to the side and bottom faces of the specimens, and aluminum foils were attached to seal the respective faces. However, petrolatum was applied to one side face (0.29 mm×350 mm) of each specimen but aluminum foil was not attached, in order to allow that side face to be observed.

Figure 13:
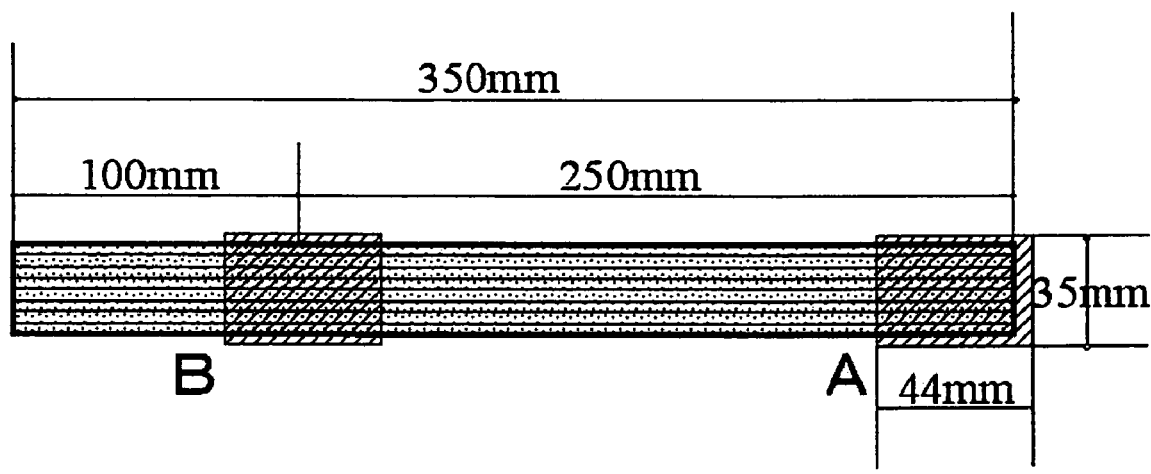
FIG. 13 is a schematic cross-sectional view showing measuring points in Experiment 8.
Figure 15A:
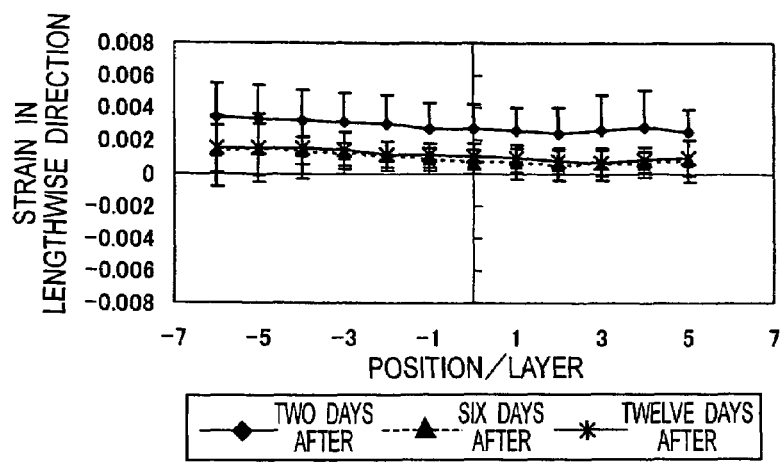
FIGS. 15 and 16 are graphs plotting the measured results in Experiment 8 for Example 7 in the form of line profiles.

Then, a moisture absorption experiment was conducted in an atmosphere of temperature 20° C. and humidity 60% RH, and the amount of warping was measured at an edge portion A and near a center portion B shown in FIG. 13; then, images of the side faces captured by a digital camera were analyzed using a digital image correlation method, and strain distributions were obtained. The amount of warping in Example 4 is shown in FIG. 14, the strain distributions in the edge portion A of the specimen of Example 4 are shown in FIG. 15, the strain distributions near the center portion B of the specimen of Example 4 are shown in FIG. 16, and the strain distributions near the center portion B of the specimen of Comparative example 1 are shown in FIG. 17.

Figure 14:
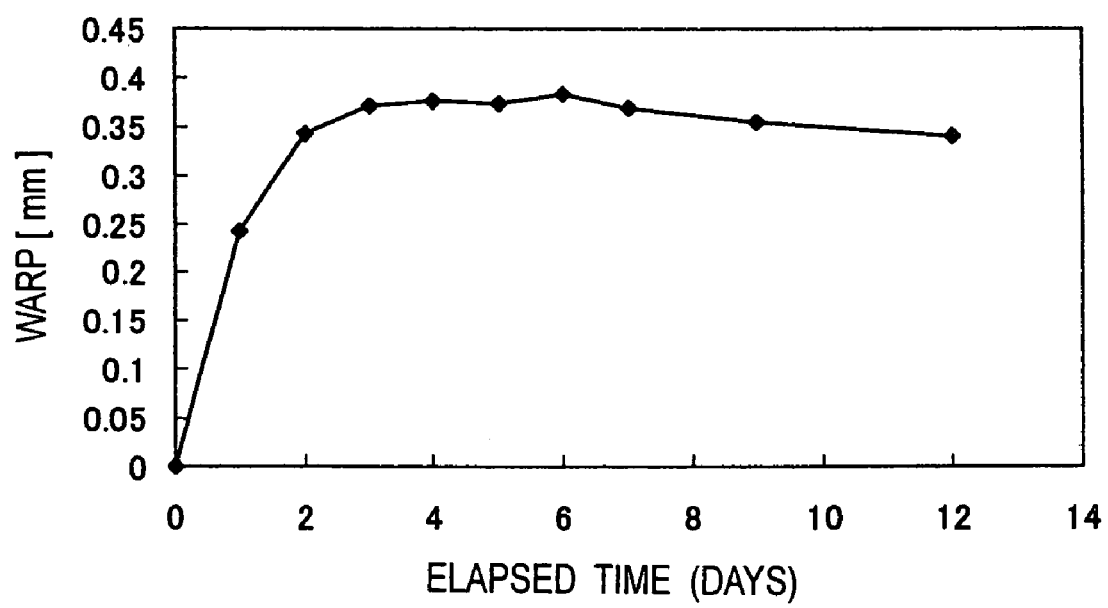
FIG. 14 is a graph showing measured results in Experiment 8 for Example 7, i.e., the change of warp (deflection) of specimens.

As can be seen from FIG. 14, the amount of warping reaches its peak on the sixth day and decreases thereafter.

Figure 15B:
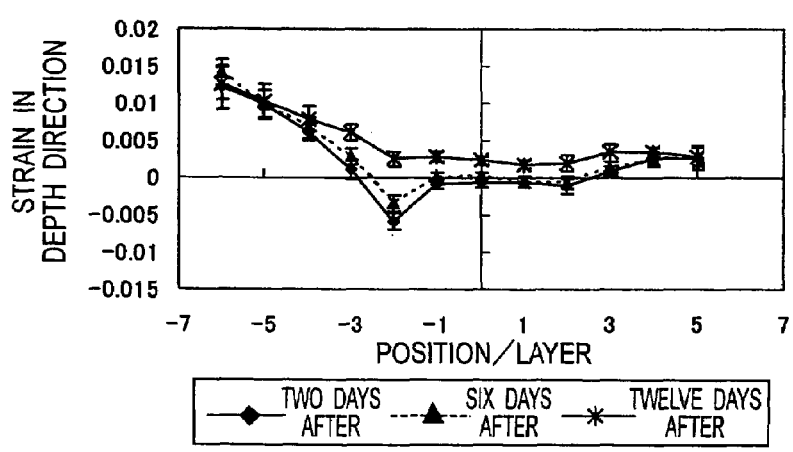
Figure 15C:
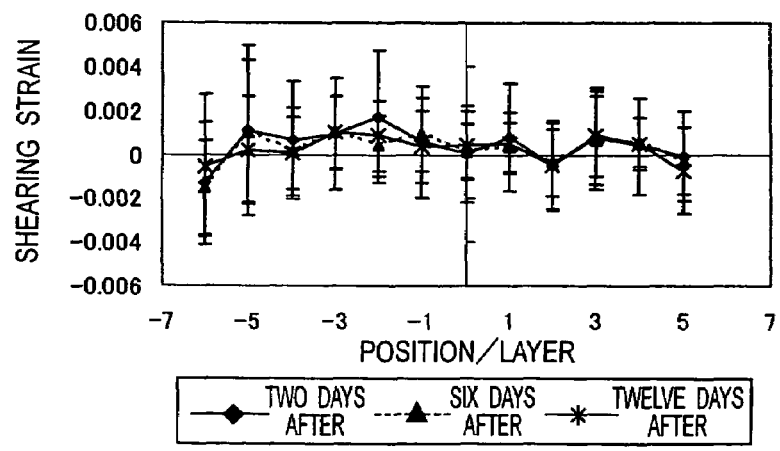
Figure 16A:
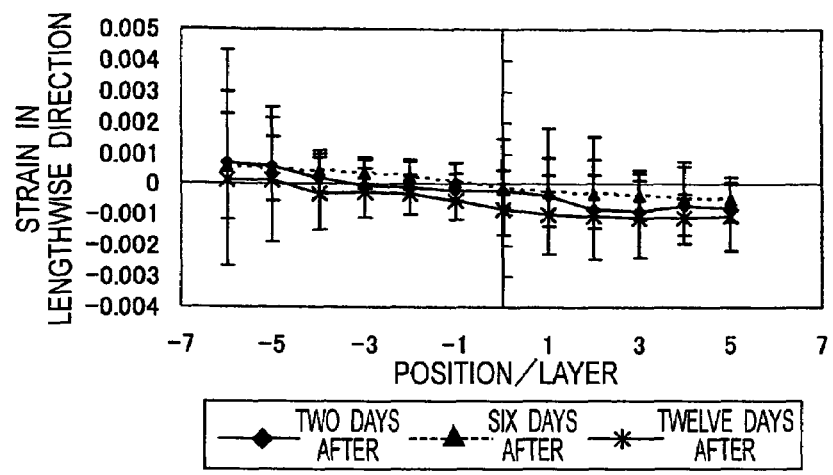
Figure 16B:
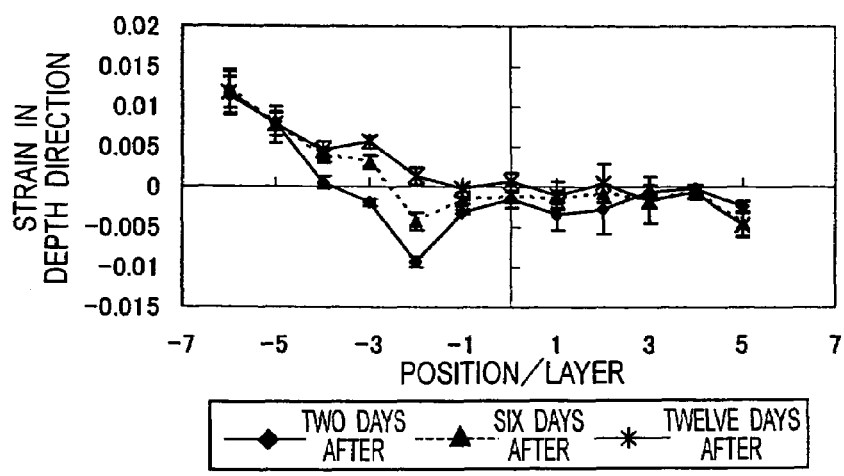
Figure 16C:
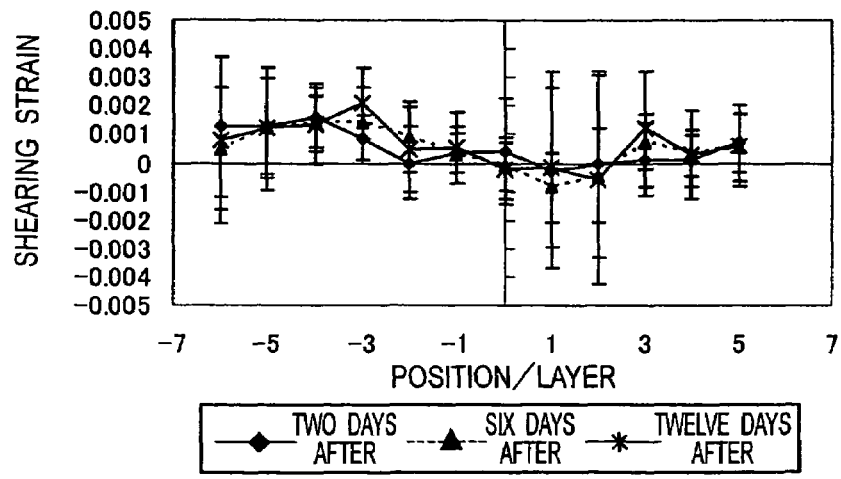
Figure 17A:
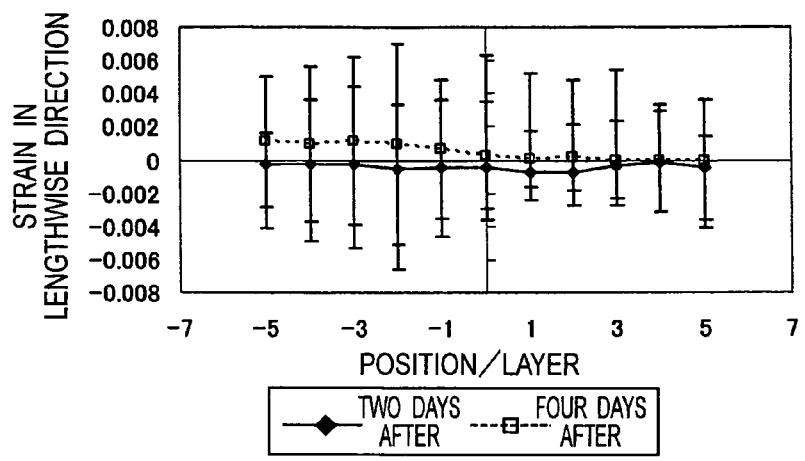
FIG. 17 is a graph plotting the measured results in Experiment 8 for Comparative example 1 in the form of line profiles.
Figure 17B:
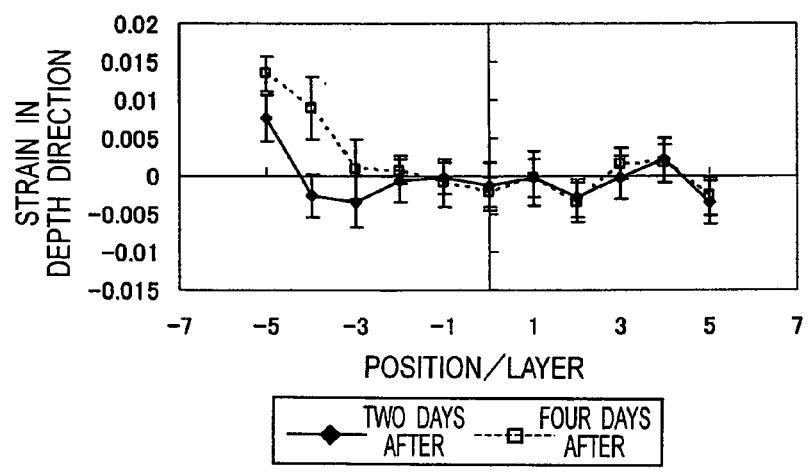
Figure 17C:
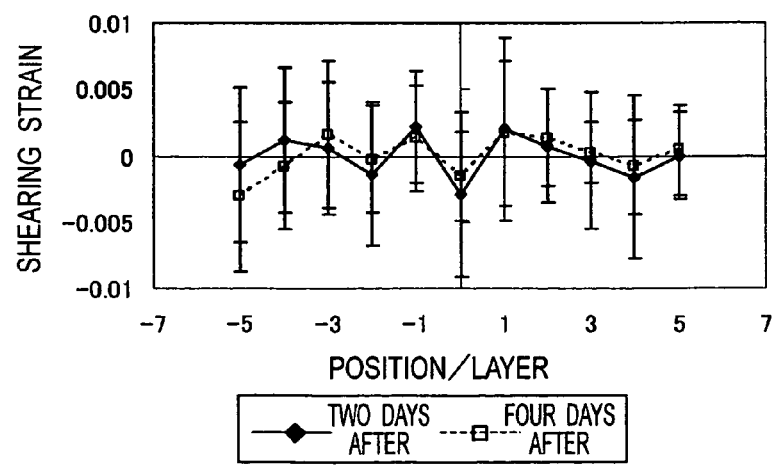

Further, when FIGS. 15B and 16B are compared in which the strain distributions in the depth direction are plotted in the form of line profiles by averaging the strain distributions obtained by the image correlation method for each layer, it has been found that the falcataria layers are greatly compressed.

As the results of the above experiment show, when bending moment occurs in a specimen due to a lengthwise expansion of an upper layer, the bending moment works to warp the specimen, while at the same time, causing a compressing force in the depth direction in the lower layers of the specimen. Here, it is deduced that soft falcataria is greatly deformed to absorb the warping of the upper layer, thus serving as a cushioning member. This can also be seen clearly from FIG. 17B which plots in the form of line profiles the strain distributions in the depth direction in the rubber-wood-only specimen of Comparative example 1; as shown, a large compressive distortion such as occurring in Example 4, is not observed here.

Accordingly, it has been found from Experiments 6, 7, and 8 that a laminated composite lumber that is substantially resistant to warping and distortion associated with moisture absorption and desorption, and that can yet serve practical purposes, can be obtained without cutting slits in the edge portions as in the earlier described Experiments 2, 3, and 4.

INDUSTRIAL APPLICABILITY

The present invention can be applied to a laminated composite lumber as a building material and a method of producing the same.

What is claimed is:

1. A laminated composite lumber constructed by stacking a veneer made of rubber wood whose oven-dry specific gravity is 0.6 or larger alternately with a veneer made of falcataria whose oven-dry specific gravity is 0.4 or less, and bonding said veneers together to construct a structure identical to a laminated veneer lumber.

2. The laminated composite lumber as set forth in claim 1, wherein said veneers are stacked and bonded together to construct a structure identical to a laminated veneer lumber, by orienting a fiber direction of at least one of said veneers at right angles to the fiber direction of the other veneers.

3. The laminated composite lumber as set forth in claim 1 or 2, wherein outermost layers forming the top and bottom surface are each formed from a rubber wood veneer whose oven-dry specific gravity is 0.6 or larger.

4. The laminated composite lumber as set forth in claim 1, wherein said veneers are formed from lathe-peeled rubber wood.

5. A laminated composite lumber constructed by stacking a veneer whose oven-dry specific gravity is 0.6 or larger, wherein a plurality of slits are formed in staggered fashion in opposite cut-end edge portions of said veneer, alternately with a wood veneer whose oven-dry specific gravity is 0.4 or less, and by bonding said veneers together to construct a structure identical to a laminated veneer lumber.

6. The laminated composite lumber as set forth in claim 5, wherein said veneers are stacked and bonded together to construct a structure identical to a laminated veneer lumber, by orienting a fiber direction of at least one of said veneers at right angles to the fiber direction of the other veneers.

7. The laminated composite lumber as set forth in claim 5 or 6, wherein the length of each of said slits is longer than one half of the length of said veneer.

8. A method of producing a laminated composite lumber, wherein a plurality of slits are formed in staggered fashion in opposite cut-end edge portions of a veneer whose oven-dry specific gravity is 0.6 or larger, and each of said cut-end edge portions is held together by means of an adhesive tape, after which said veneer whose oven-dry specific gravity is 0.6 or larger and a veneer whose oven-dry specific gravity is 0.4 or less are stacked in alternating fashion in at least three layers and bonded together.

* * * * *